United States Patent
Sugata et al.

(10) Patent No.: US 8,869,825 B2
(45) Date of Patent: Oct. 28, 2014

(54) FLOW RATE CONTROL DEVICE

(75) Inventors: Kazuhiro Sugata, Komaki (JP); Takashi Kato, Komaki (JP)

(73) Assignee: CKD Corporation, Komaki-shi, Aichi (JP)

( * ) Notice: Subject to any disclaimer, the term of this patent is extended or adjusted under 35 U.S.C. 154(b) by 1249 days.

(21) Appl. No.: 12/388,444

(22) Filed: Feb. 18, 2009

(65) Prior Publication Data

US 2009/0235993 A1 Sep. 24, 2009

(30) Foreign Application Priority Data

Mar. 19, 2008 (JP) ................... 2008-072264

(51) Int. Cl.

| F16K 31/12 | (2006.01) |
|---|---|
| F16K 31/36 | (2006.01) |
| F16K 15/00 | (2006.01) |
| F16K 17/00 | (2006.01) |
| F16K 21/04 | (2006.01) |
| F16K 31/00 | (2006.01) |
| G05D 7/06 | (2006.01) |

(52) U.S. Cl.
CPC .................... *G05D 7/0635* (2013.01)
USPC ............................ 137/488; 137/512; 251/63.6

(58) Field of Classification Search
USPC .......... 137/488, 512, 613; 251/61.2, 61.3, 63, 251/63.5, 63.6
See application file for complete search history.

(56) References Cited

U.S. PATENT DOCUMENTS

| 2,504,435 A * | 4/1950 | Matteson ........................ 62/212 |
| 6,832,628 B2 * | 12/2004 | Thordarson et al. .......... 137/613 |
| 7,069,944 B2 | 7/2006 | Morikawa et al. |
| 7,096,658 B2 * | 8/2006 | Wernberg et al. ............. 137/613 |

FOREIGN PATENT DOCUMENTS

| JP | 4-104318 U | 9/1992 |
| JP | 2000-292227 | 10/2000 |
| JP | 2004-258737 | 9/2004 |
| JP | 2005-180527 | 7/2005 |
| JP | 2007-4644 | 1/2007 |
| JP | 2007-24071 | 2/2007 |
| JP | 2007-34667 | 2/2007 |
| JP | 2007-58343 | 3/2007 |

OTHER PUBLICATIONS

Office Action dated Jan. 17, 2012 from Japanese Application No. 2008-072264.

* cited by examiner

*Primary Examiner* — Justin Jonaitis
*Assistant Examiner* — Chee-Chong Lee
(74) *Attorney, Agent, or Firm* — Beyer Law Group LLP

(57) ABSTRACT

A flow rate control device comprises a regulator that adjusts the pressure of a fluid to be supplied, a plurality of narrowed pathways arranged in parallel on the downstream side of the regulator, and an open/close section that switches a predetermined narrowed pathway amongst the plurality of narrowed pathways between an open position and a closed position. One of the pathways can be an open narrowed pathway arranged on the downstream side of the regulator and another can be an opened/closed narrowed pathway arranged downstream of the regulator in parallel with the open narrowed pathway. In this case, the open/close section that switches the opened/closed narrowed pathway between as open position and a closed position.

15 Claims, 5 Drawing Sheets

FLOW RATE CONTROL DEVICE

The present application claims priority based on Japan Patent Application No. 2008-072264 filed on Mar. 19, 2008, and the entire contents of that application is incorporated by reference in this specification.

FIELD OF THE INVENTION

The present invention relates to a flow rate control device that controls the flow rate of fluids.

BACKGROUND OF THE INVENTION

A flow rate control device is used to adjust the flow rate of fluids such liquid chemicals in semiconductor manufacturing devices, and is also employed in the pharmaceutical and chemical fields when mixing liquids in desired ratios.

In this type of flow rate control device, it is known to arrange an orifice on the downstream side of a regulator. With this flow rate control device, the flow rate of a fluid is controlled by controlling the primary pressure of the orifice (i.e., the secondary pressure of the regulator) by means of the regulator (see for example Patent Reference 1).

However, with the flow rate control device, when one attempts to control the flow rate with a high degree of precision, it will be necessary to employ an orifice having a small opening, and thus the range of flow rates that can be controlled is narrow. In contrast, when one attempts to control the flow rate across a wide range, it will be difficult to control the flow rate with good precision because an orifice with a large opening will be employed. Thus, there is a problem with the flow rate control device, in that it cannot be used to both control the flow rate in a wide range and control the flow rate with a high degree of precision.

Accordingly, a device that can solve the aforementioned problem has been proposed, in which the valve opening of the orifice is adjusted by means of a motor (see for example Patent Reference 2). According to this technology, because the valve opening of the orifice is adjusted by means of a motor, the flow rate can be controlled in a wide range by setting the valve opening large, and the flow rate can be controlled with a high degree of precision by setting the valve opening small.

[Patent Reference 1] U.S. Pat. No. 3,623,125
[Patent Reference 2] U.S. Pat. No. 3,801,570

SUMMARY OF THE INVENTION

However, with the aforementioned technology that can change the valve opening of the orifice by means of a motor, a comparatively long period of time will be needed to change the valve opening when the flow rate of a fluid is to be changed. Because of that, fluid supplied until the change in the valve opening is complete and the flow rate is stabilized may not be used and thus discarded. As a result, when high cost liquid chemicals are used as the fluid, economic losses may occur.

Even when the aforementioned technology is employed on a fluid mixing line that mixes a plurality of fluid types to generate a mixed fluid, it will take time to stabilize the mixing ratio of the fluids, and the same problem can occur.

Moreover, because control on the regulator side will be changed in a complicated manner in accordance with the valve opening of the orifice, a predetermined period of time will also be needed to perform calculations on the controller side, and thus there is no shortening the time needed until stabilization.

A primary object of the present invention is to provide a flow rate control device that can control the flow rate with a high degree of precision and in a wide range, with increased responsiveness.

In order to solve the aforementioned problem, a flow rate control device of a first aspect of the teaching comprises a regulator that adjusts the pressure of a fluid to be supplied, a plurality of narrowed pathways arranged in parallel on the downstream side of the regulator, and an open/close section that switches a predetermined narrowed pathway amongst the plurality of narrowed pathways between an open position and a closed position.

With the present teaching, a predetermined narrowed pathway amongst the plurality of narrowed pathways arranged in parallel on the downstream side of the regulator will be switched between an open position and a closed position by the open/close section. Thus, if the predetermined narrowed pathway is placed in the open position by the open/close section, the area (of the narrowed pathways as a whole) can be increased, and thus the flow rate can be controlled in a wide range. In contrast, if the predetermined narrowed pathway is placed in the closed position by the open/close section, the pathway area can be reduced, and thus the flow rate can be controlled with a high degree of precision. In addition, because the open/close section will switch the predetermined narrowed pathway between an open position and a closed position, responsiveness will improve. Thus, responsiveness can be improved, and the flow rate can be controlled with a high degree of precision and in a wide range.

In addition, in this case, the flow rate coefficient (Cv value) can be changed simply by switching the predetermined narrowed pathway between an open position and closed position by means of the open/close section, and the flow rate coefficient before and after that change can be known by adding up the pathway area of each narrowed pathway in advance. Because of this, when the flow rate is to be controlled in a wide range or with a high degree of precision by means of the controller, that process can be performed quickly and easily.

A flow rate control device of a second aspect of the teaching comprises a regulator that adjusts the pressure of a fluid to be supplied, an open narrowed pathway arranged on the downstream side of the regulator, an opened/closed narrowed pathway arranged downstream of the regulator in parallel with the open narrowed pathway, and an open/close section that switches the opened/closed narrowed pathway between an open position and a closed position.

With the present teaching, an open narrowed pathway is arranged on the downstream side of the regulator and fluid can flow through this open narrowed pathway. In addition, an opened/closed narrowed pathway that is switched between an open position and a closed position is arranged in parallel with the open narrowed pathway on the downstream side of the regulator, and by switching the opened/closed narrowed pathway between an open position and a closed position with the open/close section, fluid can flow and be prevented from flowing through the opened/closed narrowed pathway. In other words, by opening and closing the opened/closed narrowed pathway with the open/close section, the pathway area of both the open narrowed pathway and the opened/closed narrowed pathway can be switched between large and small. Then, if the opened/closed narrowed pathway is placed in the open position with the open/close section, the flow rate can be controlled in a wide range, and if the opened/closed narrowed pathway is placed in the closed position with the open/closed portion, the flow rate can be controlled with a high degree of precision. In addition, because the open/close section will switch the opened/closed narrowed pathway between an open position and a closed position, responsiveness will improve. Thus, responsiveness can be improved, and the flow rate can be controlled with a high degree of precision and in a wide range.

A flow rate control device of the third aspect of the teaching is, the device of the first or second aspect, in which an open/close valve is arranged on the downstream side of the regulator. The open/close valve includes each narrowed pathway and the open/close section, and comprises an urging section that urges the open/close section toward the closed position, and a pressing section that switches between a pressing state in which the pressing section resists the urging force of the urging section and presses the open/close section toward the open position and a released state in which the pressing is released.

According to the present teaching, when the pressing section is switched to the pressing state and the pressing section resists the urging force of the urging section, the open/close section in the open/close valve arranged on the downstream side of the regulator will be pressed toward the open position, and can open the predetermined narrowed pathway (including the opened/closed narrowed pathway). In contrast, when the pressing section is switched to the released state and the pressing will be released, the open/close valve will be urged toward the closed position by the urging section, and the predetermined narrowed pathway can be closed. In this way, the opening and closing of a predetermined narrowed pathway by switching between an open position and a closed position by means of the open/close section can be achieved with a simple construction.

In addition, because each narrowed pathway is equipped with an open/close valve, the pathways can be simplified. In this way, when assembled on for example a manufacturing line, the line can be simplified.

The flow rate control device of the fourth aspect of the teaching is, the device of the third aspect, in which the regulator comprises a valve body that is seated in and separated from a valve seat arranged in a pathway that communicates between a flow intake port and a flow discharge port in the regulator, a second urging section that urges the valve body toward the valve seat, an operation section that resists the urging force of the second urging section and presses the valve body to separate from the valve seat, as well as controls the pressure of the fluid by adjusting the pressing force applied to the valve body, and a pressure adjusting diaphragm that partitions the pathway from the housing area of the second urging section and from the operation section and is integral with the valve body. In addition, the open/close valve comprises an open/close diaphragm that partitions the fluid pathways that include each narrowed pathway from space on the pressing section side, and is integral with the open/close section.

In the present teaching, a valve seat is provided in the pathway that communicates between the fluid intake port and the fluid discharge port in the regulator, and the pressure of the fluid will be controlled by seating the valve body in the valve seat to close the pathway and separating the valve body from the valve seat to open the pathway. More specifically, the valve body will be seated in the valve seat by urging the valve body toward the valve seat with the second urging section, and the valve body will be separated from the valve seat by pressing the valve body with the operation section which resists the urging force of the second urging section.

The pressure adjustment diaphragm is integral with the valve body, and the pressure adjustment diaphragm partitions the pathway from the housing area of the second urging section and from the operation section. In this way, slides of the valve body will be eliminated or reduced, and thus factors that reduce the purity of the fluids such as generating particles can be eliminated or reduced.

The open/close diaphragm is integral with the open/close section in the open/close valve, and the fluid pathways that include each narrowed pathway are partitioned from the space on the pressing section side. Thus, with the open/close valve, like with the regulator, slides of the open/close section will be eliminated or reduced. As a result, in the flow rate control device as a whole, factors that reduce the purity of the fluids such as generating particles can be eliminated or reduced.

The flow rate control device of the fifth aspect of the teaching is, the device of the third or fourth aspect, in which the regulator and the open/close valve are integrally coupled, or formed as an integral object that employs a shared body.

In the present teaching, the regulator and the open/close valve are constructed as separate items but integrally coupled, or are formed as an integral object that employs a shared body. Because of this, the flow rate control device can be compactly constructed, and thus the flow rate control device according to the present teaching can contribute to the simplification of for example manufacturing line when integrated into the line.

The flow rate control device of the sixth aspect of the teaching is any of the devices of the first to fifth aspects, which comprises a controller that controls the regulator and the open/close section, and in which the controller controls the open/close section such that the open/close section will be placed in the closed position when the control flow rate by the regulator is small and placed in the open position when the control flow rate is large.

In the present teaching, the regulator and the open/close section can be controlled by the controller. When the control flow rate by the regulator is small, the open/close section can be placed in the closed position by the controller, and when the control flow rate by the regulator is large, the open/close section can be placed in the open position by the controller. In this way, the pathway area can be automatically switched between large and small in response to whether the control flow rate by the regulator is large or small, and the flow rate can be automatically controlled with a high degree of precision and in a wide range.

DESCRIPTION OF THE PREFERRED EMBODIMENTS

Figure 1:
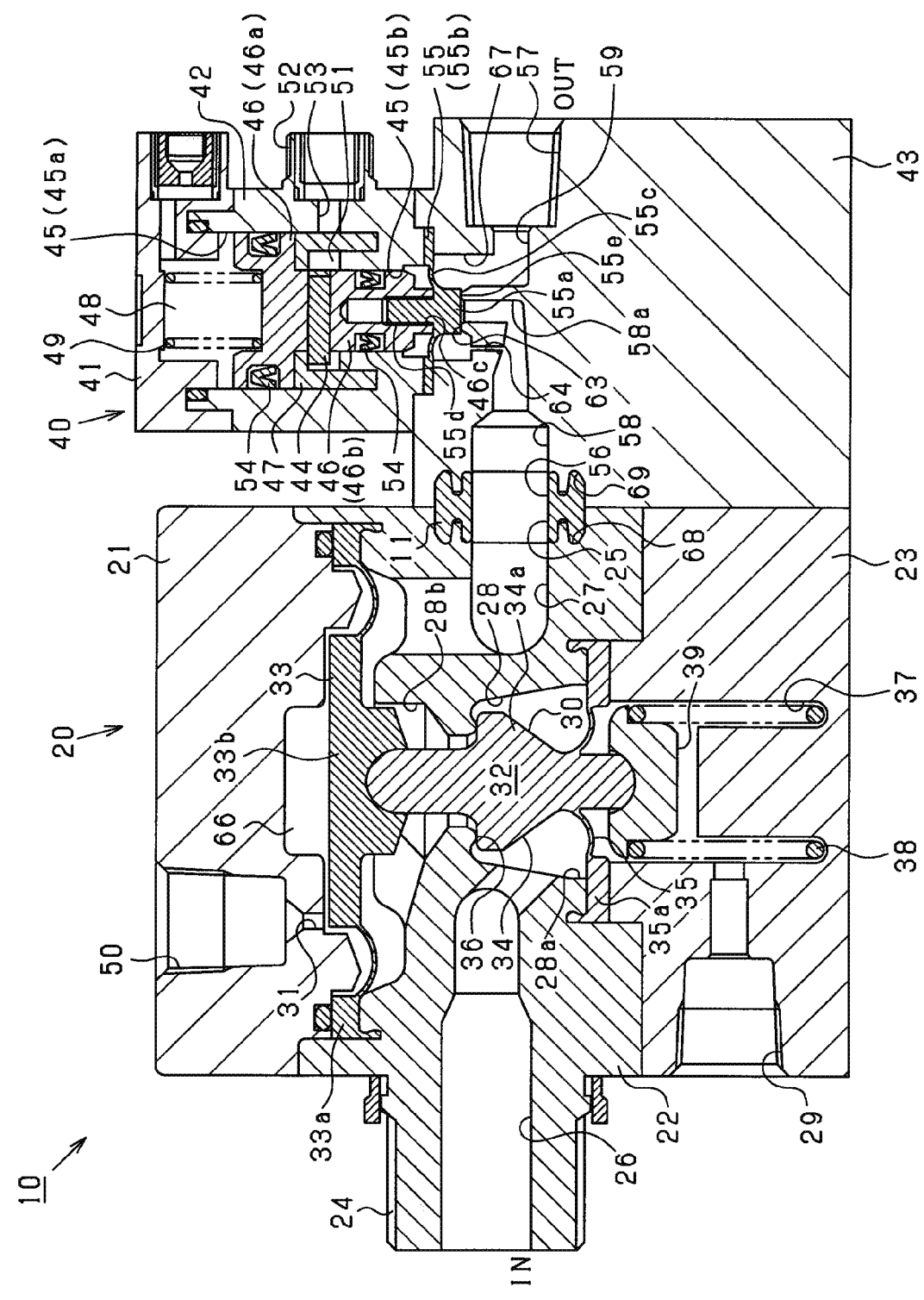
FIG. 1 A vertical cross-section showing a flow rate control device according to one embodiment.

An embodiment of a flow rate control device used for liquid chemical supply on a semiconductor manufacturing line will be explained below with reference to the drawings. FIG. 1 is a vertical cross-section showing the construction of a flow rate control device 10.

As shown in FIG. 1, the flow rate control device 10 comprises a pilot regulator 20 as a pressure adjustment means, and an air operate valve 40 arranged on the downstream side thereof, with these being integrally attached together by means of fastening members such as bolts.

The pilot regulator 20 is formed by integrally attaching an upper cover 21, a body 22, and a lower cover 23 together in this order by means of fastening members such as bolts, with its overall shape approximating a rectangle. Note that the body 22 is formed for example from a fluorine resin, and the covers 21, 23 are for example formed from a polypropylene resin.

An intake port 24 for drawing in fluid, and a supply port 25 for supplying fluid to the air operate valve 40 are provided in the body 22, and an intake pathway 26 that passes through the intake port 24, and a supply pathway 27 that passes through the supply port 25 are formed in the body 22. A pipe or the like for allowing fluids such as liquid chemicals to flow therethrough is connected to the intake port 24.

A through hole that serves as a liquid chamber 28 passes through the body 22 from the upper cover 21 to the lower cover 23 and is formed in the central portion of the body 22. The diameter of the liquid chamber 28 is small in the central portion in the axial direction of the through hole. An inner wall surface of the fluid chamber 28 projects out toward the central axis thereof at the aforementioned central portion, and the lower portion of the outward projecting portion is a valve seat 36. The lower cover 23 side of the fluid chamber 28 below the valve seat 36 is the upstream side fluid chamber 28a, and the upper cover 21 side of the fluid chamber 28 above the valve seat 36 is the downstream side fluid chamber 28b. The intake pathway 26 passes through the upstream side fluid chamber 28a, and the supply pathway 27 passes through the downstream side fluid chamber 28b.

A valve body 30 that is capable of reciprocating in the axial direction of the through hole is housed in the fluid chamber 28. The valve body 30 is constructed to include two diaphragm members 32 and 33, and these two diaphragm members 32 and 33 are integrally coupled by means of for example press fitting. Below, the lower cover 23 side of the diaphragm member 32 will be referred to as the first diaphragm member 32, and the upper cover 21 side of the diaphragm member 33 will be referred to as the second diaphragm member 33.

The first diaphragm member 32 is comprised of a rod portion 34, and a diaphragm portion 35 that is coupled with a lower cover 23 side end portion of the rod portion 34. The rod portion 34 has an expanded portion 34a in which the cross-sectional area in the central portion in the axial direction is expanded. The expanded portion 34a has a tapered shape in which the cross-sectional area thereof decreases as it approaches the diaphragm portion 35. In other words, the cross-sectional area of the expanded portion 34a reaches a maximum at the end furthest away from the diaphragm portion 35 (i.e., the end portion on the upper cover 21 side).

Basically, the lower portion of the valve body 30 that includes the expanded portion 34a is housed in the upstream side fluid chamber 28a, and the upper portion of the valve body 30 thereabove is housed in the downstream side fluid chamber 28b. The outer diameter of the upper cover 21 side end portion of the expanded portion 34a is formed to be larger than the inner diameter of the fluid chamber 28 at the valve seat 36, and thus the upper cover 21 side end portion of the expanded portion 34a can come into contact with the valve seat 36. Therefore, when the valve body 30 moves to the upper cover 21 side, the upper cover 21 side end portion of the expanded portion 34a will come into contact with the valve seat 36, and the flow of fluid between the upstream side fluid chamber 28a and the downstream side fluid chamber 28b will cut off. In contrast, when the valve body 30 moves to the lower cover 23 side, the upper cover 21 side end portion of the expanded portion 34a will separate from the valve seat 36, and fluid will flow between the upstream side fluid chamber 28a and the downstream side fluid chamber 28b.

The circumferential edge portion 35a of the diaphragm 35 is sandwiched between the body 22 and the lower cover 23. A spring housing chamber 37 is formed in the lower cover 23, and a compressed coil spring 38 is housed in the spring housing chamber 37. The end portion of the upper cover 21 side of the compressed coil spring 38 is in contact with a spring stopper 39 attached to the lower cover 23 side end portion of the first diaphragm, and the first diaphragm member 32 will be urged toward the front cover 21 side by means of the urging force of the compressed coil spring 38. In other words, the upper cover 21 side end portion of the expanded portion 34a of the rod portion 34 is kept in contact with the valve seat 36 by means of the urging force of the compressed coil spring 38.

An open port 29 that can be opened to the atmosphere in order to maintain the spring housing chamber 37 at atmospheric pressure is formed in the lower cover 23. A pipe (not shown in the drawings) is connected to the open port 29, and is open to the atmosphere at a location that will not adversely impact the semiconductor manufacturing device. In this way, changes in the volume inside the spring housing chamber 37 resulting from the deformation of the diaphragm 35 will occur smoothly.

A circumferential edge portion 33a of the second diaphragm member 33 is sandwiched between the body 22 and the upper cover 21. A central disk member 33b of the second diaphragm member 33 faces the upper cover 21 side end surface of the body 22 (more specifically, the upper end surface surrounding the fluid chamber 28), and the second diaphragm member 33 is capable of being displaced in the axial direction of the rod portion 34 by only the dimension of the gap between both of these members.

An air introduction port 50 is formed in the upper cover 21. The air introduction port 50 communicates with the space between the upper cover 21 and the second diaphragm member 33 (hereinafter referred to as a pressure operation chamber 66) via a communication pathway 31. Operating air is supplied by a pressure supply source to the air introduction port 50, and the second diaphragm member 33 is displaced in response to the operating pressure of the operating air.

With the pilot regulator 20 constructed as described above, in an initial state in which operating air is not provided in the air introduction port 50, the upper cover 21 side end portion of the expanded portion 34a of the rod portion 34 is placed into contact with the valve seat 36 by means of the urging force of the compressed coil spring 38. In this state, the flow of fluid between the upstream side fluid chamber 28a and the downstream side fluid chamber 28b will be cut off, and the flow of fluid between both fluid chambers 28a and 28b will be stopped.

In contrast to this, when operating air is supplied to the pressure operation chamber 66 by the air introduction port 50, the second diaphragm member 33 (and the valve body 30) will be displaced on the lower cover 23 side along the axial direction of the rod portion 34 in response to the operating pressure at that time. Due to this displacement, the upper cover 21 side end portion of the expanded portion 34a of the rod portion 34 will separate from the valve seat 36, and fluid will flow between the upstream side fluid chamber 28a and the downstream side fluid chamber 28b. In this way, fluid communication will be permitted. At this point, fluid drawn in by the intake port 24 will flow via the upstream side fluid chamber 28a and the downstream side fluid chamber 28b, and will be supplied from the supply port 25 to the air operate valve 40.

Then, the rod portion 34 will move to the closed side with respect to the valve seat 36 when the pressure of the upstream side fluid chamber 28a has increased, and conversely, the rod portion 34 will move to the open side with respect to the valve seat 36 when the pressure of the upstream side fluid chamber 28a has decreased, and the pressure of the downstream side fluid chamber 28b will be held stable. Due to this operation, the fluid inside the downstream side fluid chamber 28b, i.e., the pressure of the fluid supplied from the supply port 25 to the air operate valve 40, can be controlled by adjusting the operating pressure supplied to the pressure operation chamber 66.

Next, details of the construction of the air operate valve 40 will be explained.

The air operate valve 40 is constructed by integrally attaching a cover 41, a cylinder 42, and a body 43 together in this order with fastening members such as bolts, with its overall shape approximating a rectangle. Note that the cover 41 and the cylinder 42 are made for example from a polypropylene resin, and the body 43 is made for example from a fluorine resin.

A cylindrical slide hole 45 that passes from the cover 41 side to the body 43 side is formed in the cylinder 42. The slide hole 45 has a large diameter hole portion 45a and a small diameter hole portion 45b that share the same axis. A piston rod 46 is housed in the slide hole 45. The piston rod 46 has a large diameter portion 46a and a small diameter portion 46b, the large diameter portion 46a is slidably housed in the large diameter hole portion 45a, and the small diameter portion 46b is slidably housed in the small diameter hole portion 45b. Note that the piston rod 46 may for example be constructed with polypropylene resin, or may be constructed with a metal material such as stainless steel and aluminum.

A guide member 47 that is formed in a cylindrical shape is coupled to the body 43 side end portion of the large diameter portion 46a of the piston rod 46. The guide member 47 is formed so as to surround the small diameter portion 46b, and is slidably housed in the large diameter hole portion 45a of the slide hole 45. In this way, the large diameter portion 46a of the piston rod 46 will be prevented from being housed in a tilted state with respect to the large diameter hole portion 45a. In addition, a pin 44 that extends in a direction perpendicular to the axial direction of the small diameter portion 46b is arranged to pass through the small diameter portion 46b of the piston rod 46.

A spring housing chamber 48 is formed between the piston rod 46 and the cover 41. A compressed coil spring 49 is housed in the spring housing chamber 48. One end of the compressed coil spring 49 is in contact with the large diameter portion 46a of the piston rod 46, and the other end thereof is in contact with the cover 41. In this way, the piston rod 46 will always be urged toward the body 43 side along the axial direction thereof by means of the urging force of the compressed coil spring 49.

A space enclosed by the piston rod 46 and the cylinder 42 is a pressure control chamber 51. The pressure control chamber 51 is in communication with an air introduction port 52 via an air pathway 53. When operating air is supplied by the pressure supply source to the air introduction port 52, the operating air will be introduced into the pressure control chamber 51 and the air pressure inside the pressure control chamber 51 will increase. In this way, the piston rod 46 will resist the urging force of the compressed coil spring 49 and move toward the cover 41 side along the axial direction thereof. Note that annular seal members 54 used to increase the airtight characteristics of the pressure control chamber 51 are arranged on the large diameter portion 46a of the piston rod 46 and the outer circumferential portion of the small diameter portion 46b.

A diaphragm valve body 55 made for example of a fluorine resin is coupled to the body 43 side end portion of the piston rod 46. The diaphragm valve body 55 has a boss portion 55a that is coupled to the piston rod 46, a circumferential edge portion 55b that is sandwiched by the cylinder 42 and the body 43, and a diaphragm membrane portion 55c that is formed between the boss portion 55a and the circumferential edge portion 55b. A male threaded screw portion 55d is arranged on the boss portion 55a, and by screwing the male threaded screw portion 55d into a screw hole 46c of the piston rod 46, the piston rod 46 will be made integral with the diaphragm valve body 55.

An intake port 56 for drawing in fluid supplied from the pilot regulator 20, and a discharge port 57 for discharging fluid, are formed in mutually opposing sides of the body 43, as well as an intake pathway 58 that passes through the intake port 56 and a discharge pathway 59 that passes through the discharge port 57. A circular channel 67 that is coaxial with the slide hole 45 and communicates with the slide hole 45 is formed in the cylinder 42 side end portion of the body 43, and the intake pathway 58 and the discharge pathway 59 are in communication with the circular channel 67. More particularly, the intake pathway 58 communicates with the circular channel 67 at the central portion of the circular channel 67, and the discharge pathway 59 communicates with the circular channel 67 at an eccentric position of the circular channel 67.

An orifice (hereinafter referred to as a valve seat orifice) 58a having a narrowed flow path diameter is formed at the end of the intake pathway 58 on the circular channel 67 side. The circumference of the opening on the circular channel 67 side of the valve seat orifice 58a is a valve seat 63, and a valve section 55e formed on the opposite end portion of the piston rod 46 of the diaphragm valve body 55 will come into contact therewith. Thus, when the diaphragm valve body 55 moves along the axial direction of the boss portion 55a to the side away from the cover 41 (the closed position), the valve section 55e will come into contact with the valve seat 63, and the flow of fluid via the valve seat orifice 58a will be stopped. In contrast, when the diaphragm valve body 55 moves along the axial direction of the boss portion 55a toward the cover 41 (the open position), the valve section 55e will be separated from the valve seat 63, and fluid will be allowed to flow via the valve seat orifice 58a. Then, by applying or not applying operating air via the air introduction port 52 to the pressure control chamber 51, dual position switching of the diaphragm valve body 55 of the present embodiment will occur between the open position and closed position.

An orifice (hereinafter referred to as a fixed orifice) 64 that communicates with the intake pathway 58 (more particularly, the valve seat orifice 58a) and the circular channel 67 is formed in the body 43. Even in the event that the flow of fluid via the valve seat orifice 58a is stopped by the diaphragm valve body 55, the intake pathway 58 and the discharge pathway 59 will always be in communication via the fixed orifice 64. The valve seat orifice 58a and the fixed orifice 64 may be referred to as narrowed pathways. More specifically, the valve seat orifice 58a may be referred to as an opened/closed narrowed pathway, and the fixed orifice 64 may be referred to as an open narrowed pathway.

With the air operate valve 40 constructed as described above, when operating air is not introduced via the air introduction port 52 to the pressure control chamber 51, the valve member 55e will be in a closed position in which it is placed in contact with the valve seat 63 by means of the urging of the compressed coil spring 49. In this case, the flow of fluid between the valve seat orifice 58a and the circular channel 67 will be cut off, and fluid will not be permitted to flow via the valve seat orifice 58a. In other words, in this case, the fluid supplied from the pilot regulator 20 will flow from the intake pathway 58 to the discharge pathway 59 via only the fixed orifice 64.

In contrast, when operating air is supplied from a pressure supply source to the pressure control chamber 51 via the air introduction port 52, the piston rod 46 (and the diaphragm valve body 55) will resist the urging force of the compressed coil spring 49 and move to the cover 41 side, and the valve 55e will be switched to an open position that is separated from the valve seat 63. In this way, the valve seat orifice 58a and the circular channel 67 will be in communication, and fluid will be permitted to flow via the valve seat orifice 58a. In other words, in this case, the fluid supplied from the pilot regulator 20 will flow from the intake pathway 58 to the discharge pathway 59 via not only the fixed orifice 64 but also the valve seat orifice 58a.

An H seal 11 serving as a seal member is interposed between the pilot regulator 20 and the air operate valve 40 constructed as described above, and the pilot regulator 20 and the air operate valve 40 are integrally attached thereto by means of bolts or the like. The vertical cross-section of the H seal 11 is H shaped, and formed in an overall annular shape. The H seal 11 is made for example of a fluorine resin such as PFA.

The H seal 11 is interposed between the circumference of the supply port 25 of the pilot regulator 20 and the circumference of the intake port 56 of the air operator valve 40. More specifically, concave/convex portions 68 and 69 that each engage with the concave/convex portions of the H seal 11 are formed in the circumference of the supply port 25 and the intake port 56, and the H seal 11 is interposed between the pilot regulator 20 and the air operate valve 40 in a state in which it is engaged with the concave/convex portions 68 and 69. In this way, the positioning between the ports of the pilot regulator 20 and the air operate valve 40 can be attained while preventing fluid from leaking externally between the pilot regulator 20 and the air operate valve 40.

Next, a mixed liquid generating circuit that uses the flow rate control device 10 to mix liquid chemicals at a predetermined ratio and generate a mixed liquid will be explained based upon FIG. 2 and FIG. 3. Note that FIG. 2 is a schematic diagram showing the overall construction of the mixed fluid generation circuit, and FIG. 3 is a schematic diagram showing the construction of the flow rate control system.

Figure 2:
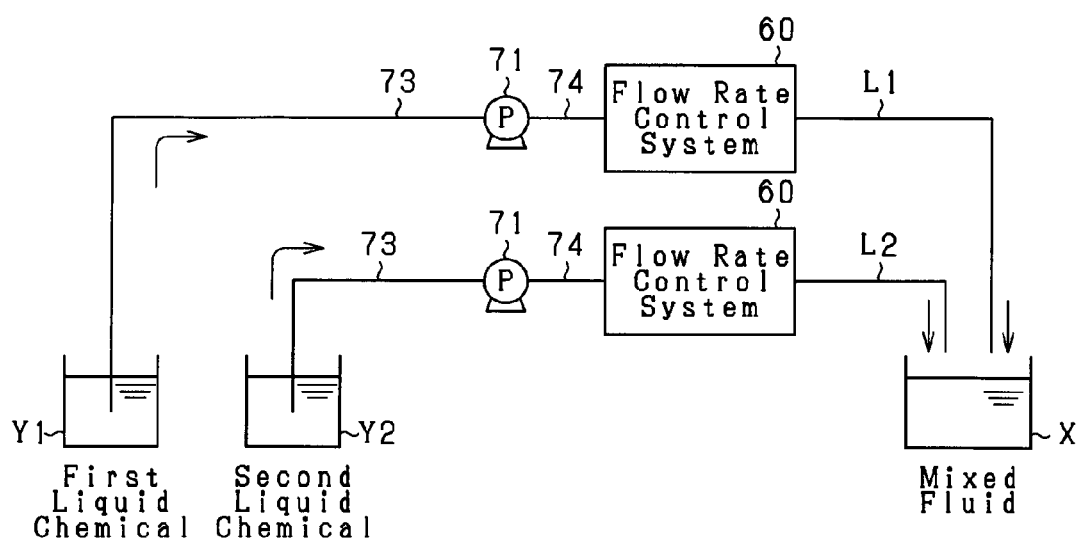
FIG. 2 A schematic diagram showing the overall construction of a mixed fluid control circuit according to one embodiment.
Figure 3:
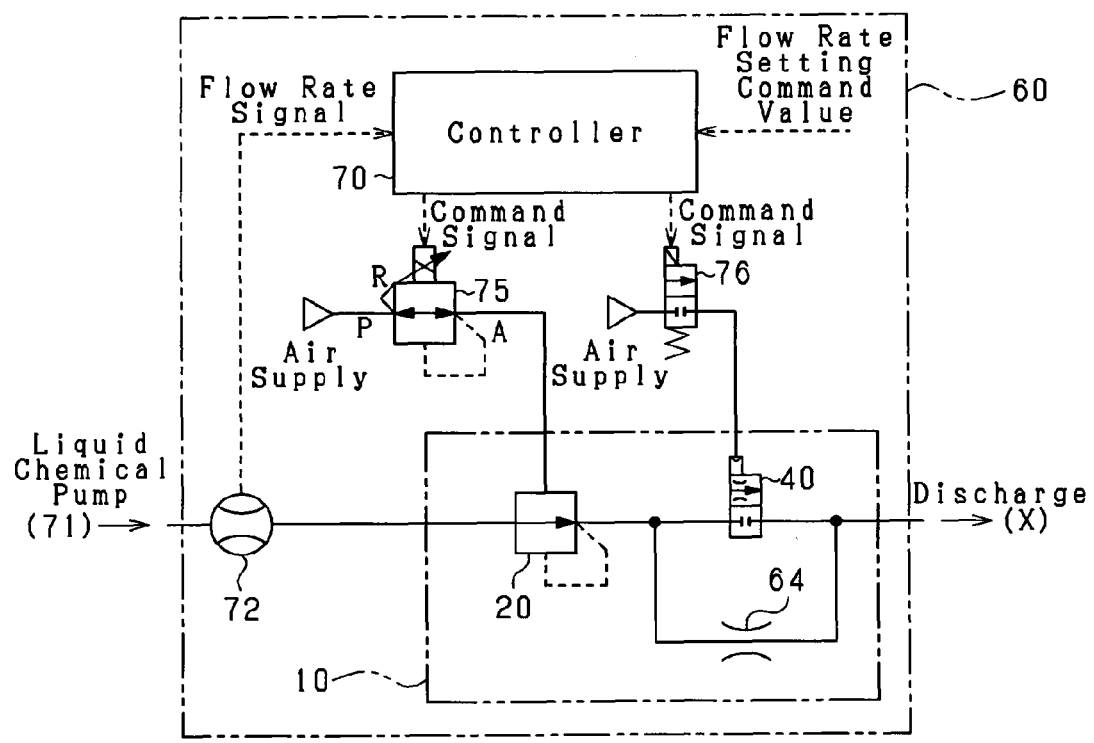
FIG. 3 A circuit diagram showing the construction of a flow rate control system according to one embodiment.

As shown in FIG. 2, there are two liquid chemical tanks Y1 and Y2 provided in the mixed liquid generation circuit, and the liquid chemical tank Y1 is filled with a first liquid chemical and the liquid chemical tank Y2 is filled with a second liquid chemical. The first liquid chemical and the second liquid chemical are liquid chemicals having different compositions. The present circuit serves to mix these liquid chemicals at a suitable ratio and discharge this mixture.

The present circuit is comprised of a first liquid chemical circuit L1 and a second liquid chemical circuit L2. These circuits L1 and L2 are identical circuits comprised of identical components, and thus identical reference numbers will be used for the components in FIG. 2.

A liquid chemical pump 71 that draws in and discharges liquid chemical is provided in each circuit L1 and L2. The liquid chemical pump 71 is, for example, a diaphragm pump or a cascade pump. Each liquid chemical that fills the liquid chemical tanks Y1 and Y2 will be drawn in by the liquid chemical pumps 71 via intake lines 73 that form each liquid chemical intake pathway.

Discharge lines 74 that form the liquid chemical discharge pathways are connected to the discharge side of the liquid chemical pump 71. Flow rate control systems 60 are arranged as a flow rate control means on the discharge line 74. The liquid chemical discharged by the liquid chemical pumps 71 will be supplied to a mixed liquid tank X via the flow rate control systems 60. Thus, each liquid chemical will be controlled at a predetermined flow rate in the flow rate control system, and as a result, will be discharged to the mixed liquid tank X at a predetermined mixing ratio.

As shown in FIG. 3, a flow rate sensor 72 that detects the flow rate of liquid chemical, and the flow rate control device 10 that is connected in series therewith on the downstream side thereof, comprise a part of the flow rate control system 60. An electropneumatic regulator 75 and an electromagnetic valve 76 as air supply means are each connected to the pilot regulator 20 and the air operate valve 40 that form the flow rate control device 10.

The electropneumatic regulator 75 is connected to the air introduction port 50 of the pilot regulator 20. The electromagnetic regulator 75 has a construction that can adjust the operating air pressure to any level, and by regulating the operating air pressure, the air pressure inside the pressure operation chamber 66 of the pilot regulator 20 will be adjusted.

In contrast, the electromagnetic valve 76 is connected to the air introduction port 52 of the air operate valve 40. The electromagnetic valve 76 will supply or cut off air to the pressure control chamber 51 of the air operate valve 40 by opening and closing in response to the flow of electricity. In other words, the air operate valve 40 is constructed to open and close by means of the opening and closing of the electromagnetic valve 76. Note that when the supply of air to the pressure control chamber 51 is stopped, the interior of the pressure control chamber 51 will for example be open to the atmosphere, and the pressurized state will be released.

The flow rate control system 60 further comprises a controller 70. The controller 70 is an electronic control device that has as its main constituent a microcomputer comprising a CPU, various types of memory, and other devices. A flow rate setting command value (a target flow rate value) that is based upon a mixing ratio setting value from a management computer that controls and manages the present system will be input into the controller 70, and the liquid flow rate detected by the flow rate sensor 72 will be sequentially input. The controller 70 will drive the electropneumatic regulator 75 and the electromagnetic valve 76 based upon these inputs, and perform flow rate feedback control.

With the construction described above, the controller 70 will calculate a primary pressure P1 of the air operate valve 40 (i.e., the secondary pressure of the pilot regulator 20) based upon the secondary pressure P2 and the liquid flow rate Q of the air operate valve 40, and will employ that calculation in the following equation (1).

$$P1 = P2 + G \cdot (Q/45.16 Cv)^2 \tag{1}$$

Note that Cv is a flow rate coefficient, and G is specific gravity (G=1 if the fluid is water). The flow rate coefficient Cv is calculated based upon the valve opening. In the case of the present embodiment, the flow rate coefficient Cv is calculated based upon the opening of the fixed orifice 64 when the diaphragm valve body 55 (of the air operate valve 40) is closed, and is for example Cv=0.1. In contrast, the flow rate coefficient Cv is calculated based upon the opening of the fixed orifice 64 and the valve seat orifice 58a when the diaphragm valve body 55 is open, and is for example Cv=0.5.

Here, the fluid flow rate Q is detected by the flow rate sensor 72, and the secondary pressure P2 is atmospheric pressure.

The controller 70 will calculate the target value (target pressure) of the primary pressure P1 by means of the aforementioned equation (1) based upon the flow rate setting command value (target flow rate value) input from the management computer, and will calculate the primary pressure P1 (actual pressure) based upon the fluid flow rate Q detected by the flow rate sensor 72 and the secondary pressure P2 (atmospheric pressure). Then, the controller 70 will calculate the deviation between the target pressure and the actual pressure of the primary pressure P1, as well as perform a calculation such as a PID calculation based upon that pressure deviation, and then output a command signal to the electropneumatic regulator 75.

The electropneumatic regulator 75 will adjust the operating air pressure based upon the command signal from the controller 70. In this way, the pressure (pilot pressure) of the pressure operation chamber 66 will be adjusted upward or downward in the pilot regulator 20. By repeatedly performing the aforementioned series of processes, the primary pressure P1 (i.e., the secondary pressure of the pilot regulator 20) will converge with the target pressure, and the fluid flow rate Q will converge with the setting command value.

In addition, the controller 70 will output an open command signal to the electromagnetic valve 76 when the flow rate setting command value (the target flow rate value) is at or above a predetermined threshold (e.g., 2.5 (l/min)), and open the electromagnetic valve 76. In this way, operating air will be supplied to the pressure control chamber 51 of the air operate valve 40, and the valve seat orifice 58a will be opened. In contrast, the controller 70 will output a close command signal to the electromagnetic valve 76 when the flow rate setting command value is smaller than the predetermined threshold, and close the electromagnetic valve 76. In this way, the supply of operating air to the pressure control chamber 51 of the air operate valve 40 will be stopped, and the valve seat orifice 58a will be closed.

The flow rate of the fluid (liquid chemical) in each liquid chemical circuit L1 and L2 will be controlled with the control steps described above. In this way, each liquid chemical can be discharged to the mixed liquid tank X at a set mixing ratio.

Figure 4:
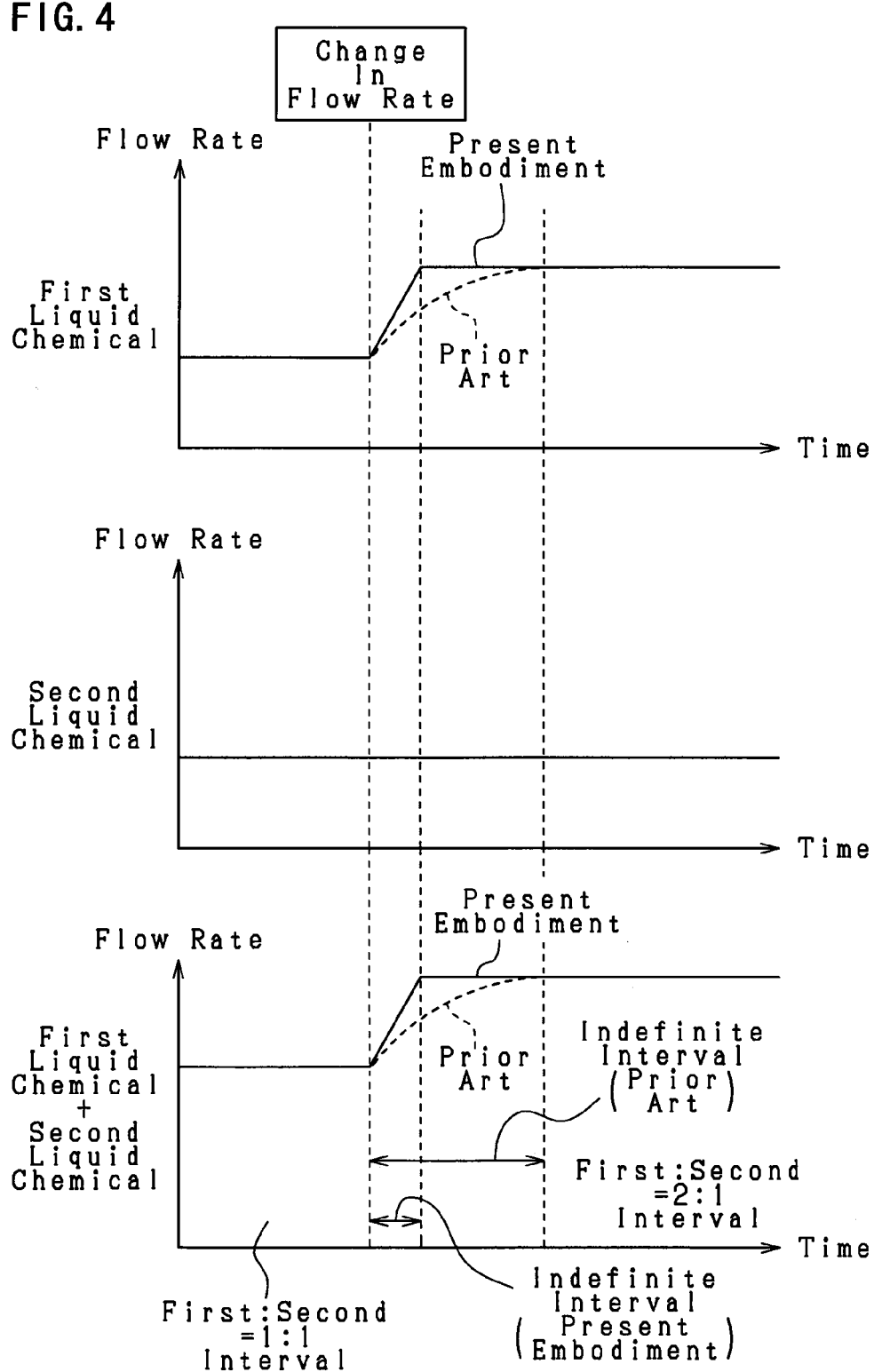
FIG. 4 A diagram showing the temporal change in the mixing ratio of liquid chemicals according to one embodiment.

Next, the responsiveness of the mixing ratio of the liquid chemical when the mixing ratio is changed in the present mixed chemical generation circuit will be compared to a conventional example, and explained based upon FIG. 4. Note that FIG. 4 shows the temporal change in the mixing ratio when the mixing ratio of the first liquid chemical and the second liquid chemical is changed from 1:1 to 2:1.

Conventionally, when the mixing ratio of the first liquid chemical and the second liquid chemical was to be changed from 1:1 to 2:1 during the generation of a mixed fluid, the flow rate of the first liquid chemical was doubled by adjusting the valve opening of the valve provided in the liquid chemical circuit L1 with a motor, which thereby changed the mixing ratio (e.g., the flow rate control device shown in Patent Reference 2 noted above). However, when adjusting the valve opening with a motor, time will be needed to double the flow rate of the first liquid chemical, and thus time will also be needed to stabilize the mixing ratio of each liquid chemical to 2:1 (see broken lines in FIG. 4). Thus, a situation is envisaged in which liquid chemical must be discarded until the mixing ratio of each liquid chemical is stabilized (the unstable period in FIG. 4). Because of that, economic losses were large when high cost liquid chemicals were used.

In contrast, with the flow rate control device 10 of the present embodiment, when the mixing ratio between the first liquid chemical and the second liquid chemical is to be changed from 1:1 to 2:1 during the generation of a mixed fluid, after increasing the pathway area by opening the valve seat orifice 58a in the air operate valve 40 in the liquid chemical circuit L1 and thus widening the flow rate range that can be controlled, the flow ratio of each liquid chemical can then be stabilized to 2:1 by controlling the flow rate with the pilot regulator 20.

In the present embodiment, the flow rate of the first liquid chemical when the mixing ratio between the first liquid chemical and the second liquid chemical is 1:1 will be set to be smaller than the predetermined threshold noted above (e.g., 2.5 (l/min)). In other words, the valve seat orifice 58a can be closed when the mixing ratio of each liquid chemical is 1:1, and the flow rate can be controlled with a high degree of precision. In contrast, the flow rate of the first liquid chemical when the mixing ratio between the first liquid chemical and the second liquid chemical is 2:1 is set to the predetermined threshold or higher. Thus, when the mixing ratio between the first liquid chemical and the second liquid chemical is to be changed from 1:1 to 2:1, the valve seat orifice 58a will open, the flow rate of the first liquid chemical will be placed in a state in which it can be controlled in a wide range (e.g., set at the predetermined threshold or higher), and the flow rate of the first liquid chemical will be controlled so that the mixing ratio of each liquid chemical will become 2:1 by means of the pilot regulator 20.

As described above, in the present embodiment, the mixing ratio between the first liquid chemical and the second liquid chemical can be changed from 1:1 to 2:1 by opening the valve opening orifice 58a with the dual position switching diaphragm valve body 55 that improves responsiveness, and thereby makes the flow rate of the first chemical controllable in a wide range. Thus, compared to the prior art, the unstable period needed to stabilize the mixing ratio of each liquid chemical to 2:1 can be reduced (refer to the solid line in FIG. 4). In this way, the flow rate of the liquid chemical that must be discarded while the mixing ratio of each liquid chemical is stabilized can be reduced.

According to the construction of the present embodiment described in detail above, the following effects will be obtained.

The air operate valve 40 is provided on the downstream side of the pilot regulator 20, and the orifice 64 that is always open and the valve seat orifice 58a that opens and closes by displacement of the diaphragm valve body 55 are formed in parallel in the air operate valve 40. Thus, if the valve seat orifice 58 is opened by moving the diaphragm valve body 55 to the cover 41 side, fluid will flow at a comparatively high flow rate via the fixed orifice 64 and the valve seat orifice 58a, and if the valve seat orifice 58a is closed, fluid will flow at a comparatively low flow rate via the fixed orifice 64. Because of that, the present embodiment can both satisfy the need to control the flow rate in a wide range, and the need to control the flow rate with a high degree of precision.

Because the diaphragm valve body 55 of the present embodiment switches positions between an open position and a closed position, the present air operate valve 40 improves responsiveness. Therefore, the flow rate can be controlled with a high degree of precision or in a wide range with responsiveness.

The valve seat orifice 58a will be closed by seating the diaphragm valve body 55 in the valve seat 63 with the urging force of the compressed coil spring 49, and the valve seat orifice 58a will be opened by introducing operating air in the pressure control chamber 51 and separating the diaphragm valve body 55 from the valve seat 63. In this way, the opening and closing of the valve seat orifice 58a can be achieved with a simple construction.

In the pilot regulator 20, the flow path (fluid chamber 28) is partitioned from the spring housing chamber 37 and the pressure operation chamber 66 with the diaphragm members 32 and 33, and the flow of fluid is permitted and prevented in accordance with the deformation of the diaphragm members 32 and 33. In addition, in the air operate valve 40, the flow path (circular chamber 67) is partitioned from the space on the pressure control chamber 51 side with the diaphragm valve body 55, and the flow of fluid is permitted and prevented in accordance with the deformation of the diaphragm valve body 55. Thus, the pilot regulator 20 and the air operate valve 40 are both constructed without slide portions inside fluid pathways. Because of this, the generation of particles will be inhibited, and thus the aforementioned flow rate control device 10 will excel at handling fluids having a high degree of purity on for example a semiconductor manufacturing line.

Because the aforementioned flow rate control device 10 is constructed by integrally attaching the pilot regulator 20 and the air operate valve 40 together with fastening members such as bolts, the flow rate control device 10 is compactly constructed. In this way, for example, when integrated into a manufacturing line, the line can be simplified.

When the flow rate setting command value (target flow rate value) is a predetermined threshold or above (e.g., 2.5 (l/min)), the valve seat orifice 58a can be opened, and when the flow rate setting command value is below a predetermined threshold, the valve seat orifice 58a can be closed. In this way, the flow path area can be automatically switched between large and small depending upon whether the flow rate setting command value (target flow rate value) is larger or smaller than a predetermined threshold, and the fluid flow rate can be automatically controlled with a high degree of precision and in a wide range.

The present invention is not limited to the aforementioned embodiment, and may for example be implemented as follows.

(1) In the aforementioned embodiment, two orifices 58a and 64 were provided in the air operate valve 40, but 3 or more orifices may be provided. In this case, one will be a fixed orifice, and the remaining plurality of orifices may be dual position switching (on/off type) valve seat orifices.

(2) In the aforementioned embodiment, the fixed orifice 64 is always open, but the fixed orifice 64 may be made a dual position switching type (on/off type) valve seat orifice with a diaphragm valve like the valve seat orifice 58a. If this is done, the supply of fluid can be stopped in the air operate valve 40 by closing both orifices 58a and 64.

(3) In the aforementioned embodiment, the flow rate control device 10 was described as being employed in liquid chemical supply on a semiconductor manufacturing line, but it may be employed in something other than liquid chemical supply, and may be employed for something other than the control of fluid flow rates. For example, the flow rate control device 10 can also be employed on a pharmaceutical manufacturing line, or employed on a chemical products manufacturing line.

Figure 5:
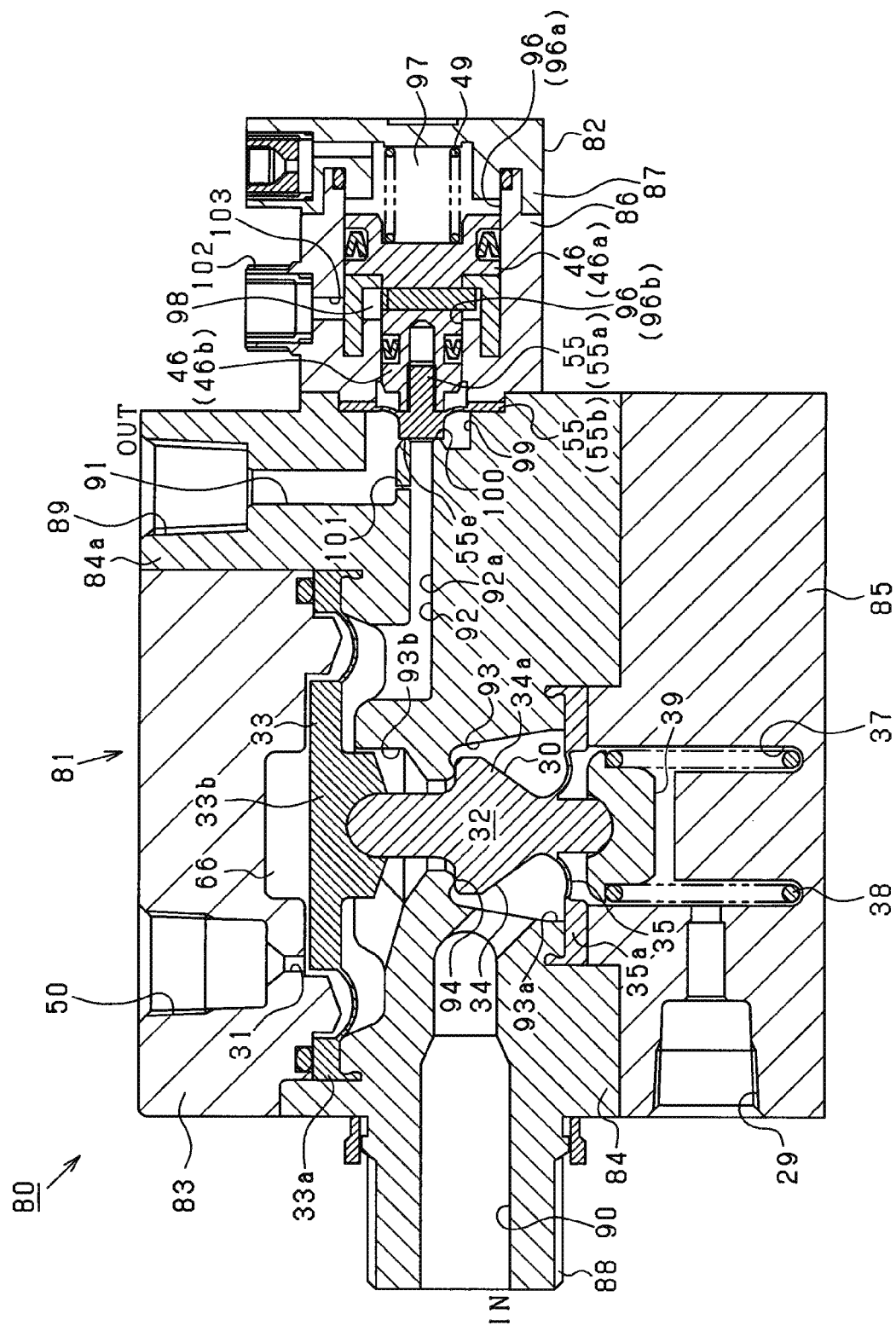
FIG. 5 A vertical cross-section showing the construction of a flow rate control device according to another embodiment.

(4) In the aforementioned embodiment, the flow rate control device 10 was constructed by integrally attaching the separately constructed pilot regulator 20 and the air operate valve 40, but the air operate valve 40 may be provided as an accessory to the pilot regulator 20. In this example, the points that differ with the aforementioned embodiment will be described below with reference to FIG. 5. Note that in FIG. 5, the components that correspond to those in FIG. 1 have the same reference numbers for the sake of convenience.

A flow rate control device 80 comprises a regulator section 81 as a pressure control means, and a valve section 82 connected on the downstream side thereof.

The regulator section 81 is constructed by integrally attaching an upper cover 83, a body 84, and a lower cover 85 together in this order with fastening members such as bolts, with its overall shape approximating a rectangle. The body 84 has a protruding portion 84a that extends on the one side surface thereof away from the cover 85. Because of that, the vertical cross section of the body 84 is approximately L shaped. Thus, in more detail, the regulator section 81 is constructed so that the upper cover 83 is arranged on the inner side of the L shape of the body 84, and the lower cover 85 is arranged on the side opposite the upper cover 83 that sandwiches the body 84.

The valve section 82 comprises a cylinder 86 and a cover 87, and is coupled to the side surface of the body 84 on the protruding portion 85a side. More specifically, the valve section 82 is coupled to the body 84 and the regulator section 81, by attaching the body 84, a cylinder 86, and a cover 87 together in this order with fastening members such as bolts.

An intake port 88 for drawing in fluid, and a discharge port 89 for discharging fluid, are provided in the body 84, and an intake pathway 90 that passes through the intake port 88, and a discharge pathway 91 that passes through the discharge port 89, are formed in the body 84. More particularly, the discharge port 89 and the discharge pathway 91 are formed in the protruding portion 84a of the body 84. In addition, an intermediate pathway 92 that conducts fluid from the intake pathway 90 to the discharge pathway 91 is formed in the body 84.

A through hole that serves as a fluid chamber 93 and passes through the body 84 from the upper cover 83 side to the lower cover 85 side is formed in the central portion of the body 84. As in the aforementioned embodiment, the lower cover 85 side of the fluid chamber 93 below the valve seat 94 formed in the axial direction of the through hole is the upstream side fluid chamber 93a, and the upper cover 83 side of the fluid chamber 93 above the valve seat 94 is the downstream side fluid chamber 93b. Then, the intake pathway 90 is in communication with the upstream side fluid chamber 93a, and the intermediate pathway 92 is in communication with the downstream side fluid chamber 93b.

A valve body 30 that is capable of reciprocating in the axial direction of the through hole is housed in the fluid chamber 93. The construction of the valve body 30 and the area around the valve body 30 is basically identical to the aforementioned embodiment, and thus a detailed explanation will be omitted.

As with the aforementioned embodiment, the upper cover 83 side end portion of the expanded portion 34a of the rod portion 34 is kept in contact with the valve seat 94 by means of the urging force of the compressed coil spring 38. In this way, the upstream side fluid chamber 93a is always cut off from the downstream side fluid chamber 93b. In contrast to this, when operating air is introduced to the pressure operation chamber 66 from the air introduction port 50 formed in the upper cover 83, the second diaphragm member 33 will be displaced toward the lower cover 85 side along the axial direction of the rod portion 34 in response to the operation pressure at that time. Due to this displacement, the upper cover 83 side end portion of the expanded portion 34a of the rod portion 34 will separate from the valve seat 94, and fluid will be permitted to flow because the upstream side fluid chamber 93a and the downstream side fluid chamber 93b will be in communication.

Note that the circumferential edge portion 35a of the diaphragm portion 35 is sandwiched by the body 84 and the lower cover 85, and the circumferential edge portion 33a of the second diaphragm member 33 is sandwiched by the body 84 and the upper cover 83.

A cylindrical slide hole 96 that passes from the cover 87 side to the body 84 side is formed in the cylinder 86, and a piston rod 46 is housed in the slide hole 96. As with the aforementioned embodiment, the slide hole 96 has a large diameter portion 96a and a small diameter portion 96b that are coaxial with each other, the large diameter portion 96a is slidably housed in the large diameter hole portion 46a, and the small diameter portion 46b is slidably housed in the small diameter hole portion 96b. The construction of the area around the piston rod 46 is basically identical to the aforementioned embodiment, and thus a detailed explanation will be omitted, but an outline of the construction will be explained below.

A spring housing chamber 97 is formed between the piston rod 46 and the cover 87, and a compressed coil spring 49 is housed in the spring housing chamber 97. The piston rod 46 will be urged toward the body 84 side along the axial direction thereof by means of the urging force (compression repulsion force) of the compressed coil spring 49. In contrast, when operating air is introduced from an air introduction port 102, via an air pathway 103, into the space (hereinafter referred to as a pressure control chamber 98) surrounded by the piston rod 46 and the cylinder 86, the piston rod 46 can resist the urging force of the compressed coil spring 49 and move toward the cover 87 side (the right in FIG. 5) along the axial direction of the piston rod 46.

The diaphragm valve body 55 is coupled to the body 84 side end portion of the piston rod 46. The circumferential edge portion 55a of the diaphragm valve body 55 is sandwiched between the body 84 and the cylinder 86.

A circular channel 99 that is approximately coaxial with the slide hole 96 and that communicates with the slide hole 96 is formed in the cylinder 86 side end portion of the body 84, and the intermediate pathway 92 and the discharge pathway 91 are in communication with the circular channel 99. More particularly, the intermediate pathway 92 communicates with the circular channel 99 at the central portion of the circular channel 99, and the discharge pathway 91 communicates with the circular channel 99 at the circumferential side end portion of the circular channel 99.

The intermediate pathway 92 includes an orifice (hereinafter referred to as a valve seat orifice) 92a having a narrowed flow path diameter at the end of the pathway on the circular channel 99 side. The circumference of the opening of the valve seat orifice 92a of the circular channel 99 is a valve seat portion 100, and the valve section 55e of the diaphragm valve body 55 can come into contact with the valve seat portion 100. Thus, when the diaphragm valve body 55 moves along the axial direction of the boss portion 55a to the side opposite the cover 87 side, the valve section 55e will come into contact with the valve seat portion 100, and the flow of fluid via the valve seat orifice 92a will be stopped. In contrast, when the diaphragm valve body 55 moves along the axial direction of the boss portion 55a toward the cover 87 side, the valve section 55e will be separated from the valve seat portion 100, and fluid will be allowed to flow via the valve seat orifice 92a.

An orifice (hereinafter referred to as a fixed orifice) 101 that communicates with the intermediate pathway 92 and the discharge pathway 91 is formed in the body 84. In this way, even when the flow of fluid via the valve seat orifice 92a is stopped by the diaphragm valve body 55, the intermediate pathway 92 and the discharge pathway 91 will always be in communication via the fixed orifice 101, and thus fluid will flow from the intake pathway 90 to the discharge pathway 91 via the fixed orifice 101. In contrast, when operating air is supplied to the pressure control chamber 98 via the air introduction port 52, the piston rod 46 (and the diaphragm valve body 55) will resist the urging force of the compressed coil spring 49 and move to the cover 87 side, and when the valve section 55e is separated from the valve seat 100, fluid will flow from the intake pathway 90 to the discharge pathway 91 via the fixed orifice 101 and the valve seat orifice 92a.

According to the flow rate control device 80 described above, the same effects can be obtained as the aforementioned embodiment. In addition, the flow rate control device 80 has advantages, in that because the valve section 82 is made integral with the regulator section 81 as an accessory by sharing the body 84 with the regulator section 81 and the valve section 82, the H seal and the body adapted for the valve section 82 that was employed in the aforementioned embodiment can be made unnecessary, and the concave/convex portions 68 and 69 that is formed with complex machining in order to fit the H seal 11 need not be provided.

(5) In the aforementioned embodiment or the aforementioned other example (4), the flow rate control device 10 in which the pilot regulator 20 and the air operate valve 40 are made integral, and the flow rate control device 80 in which the regulator section 81 and the valve section 82 are made integral, were illustrated but these may be decoupled. In other words, a flow rate control device may be constructed in which the supply port 25 of the pilot regulator 20 and the intake port 56 of the air operate valve 40 communicate via pipes.

The invention claimed is:

1. A flow rate control device, comprising:
a regulator configured to adjust a pressure of a fluid to be supplied; and
an open/close valve provided downstream of the regulator, separated from but in fluid communication with the regulator, the open/close valve including:
an intake pathway provided within the open/close valve, the intake pathway being configured to receive the fluid from the regulator and flow the fluid therethrough;
a plurality of narrowed pathways provided within the open/close valve, the plurality of narrowed pathways being coupled to a downstream side of the intake pathway such that the plurality of narrowed pathways are in parallel with each other; and
an open/close section provided within the open/close valve and coupled to a downstream side of the plurality of the narrowed pathways, configured to switch one of the plurality of narrowed pathways between an open state and a closed state by moving between an open position and a closed position,
wherein the regulator comprises:
a valve body movably seated in a valve seat arranged in a pathway that communicates between a flow intake port and a flow discharge port in the regulator;
a first urging section configured to urge the valve body toward the valve seat; and
an operation section configured to resist an urging force of the first urging section and to press the valve body to separate from the valve seat, the operation section controlling the pressure of the fluid by adjusting a pressing force thereof applied to the valve body,
wherein the valve body includes:
a first diaphragm partitioning the pathway from a housing area of the first urging section such that the fluid does not pass therethrough; and
a second diaphragm partitioning the pathway from the operation section such that the fluid does not pass therethrough,
and wherein the valve body is configured to move in accordance with the pressing force applied to the second diaphragm from the operation section.

2. The flow rate control device recited in claim 1, wherein the open/close valve further includes:
a second urging section configured to always urge the open/close section toward the closed position; and
a pressing section configured to switch between a pressing state in which the pressing section resists an urging force of the second urging section and presses the open/close section toward the open position, and a released state in which the pressing is released.

3. The flow rate control device recited in claim 2, wherein the open/close valve further includes:
an open/close valve flow intake port configured to be coupled to the regulator, the flow intake port being formed at an end of the intake pathway;
an open/close valve flow discharge port;
fluid pathways formed between the open/close valve flow intake port and the open/close valve flow discharge port, the fluid pathways including the intake pathway and the plurality of narrowed pathways; and
an open/close diaphragm formed integrally with the open/close section, the open/close diaphragm partitioning the fluid pathways from the pressing section.

4. The flow rate control device recited in claim 3, wherein the open/close diaphragm is deformable and without sliding portions.

5. The flow rate control device recited in claim 1, wherein the regulator and the open/close valve are integrally coupled to each other.

6. The flow rate control device recited in claim 1, wherein the plurality of narrowed pathways include:
an open narrowed pathway which is always open; and
an opened/closed narrowed pathway configured to be switched between an open state and a closed state.

7. The flow rate control device recited in claim 6, wherein the open/close valve further includes:
a second urging section configured to always urge the open/close section toward the closed position; and
a pressing section configured to switch between a pressing state in which the pressing section resists an urging force of the second urging section and presses the open/close section toward the open position, and a released state in which the pressing is released.

8. The flow rate control device recited in claim 7, wherein the open/close valve further includes:
an open/close valve flow intake port configured to be coupled to the regulator, the flow intake port being formed at an end of the intake pathway;
an open/close valve flow discharge port;
fluid pathways formed between the open/close valve flow intake port and the open/close valve flow discharge port, the fluid pathways including the intake pathway, the open narrowed pathway, and the opened/closed narrowed pathway; and
an open/close diaphragm formed integrally with the open/close section, the open/close diaphragm partitioning the fluid pathways from the pressing section.

9. The flow rate control device recited in claim 6, wherein the regulator and the open/close valve are integrally coupled to each other.

10. The flow rate control device recited in claim 6, wherein the open narrowed pathway and the opened/closed narrowed pathway branch from the intake pathway.

11. The flow rate control device recited in claim 1, wherein the plurality of narrowed pathways branch from the intake pathway.

12. The flow rate control device recited in claim 1, further comprising:
a flow rate sensor configured to detect a flow rate of the fluid; and
a controller configured to feed-back control the regulator based on the flow rate detected by the flow rate sensor, such that the flow rate of the fluid flowing through the discharge pathway coincides with a target flow rate, the controller placing the open/close section in the closed position if the target flow rate is smaller than a predetermined value, and in the open position if the target flow rate is greater than the predetermined value.

13. The flow rate control device recited in claim 1, wherein the first and second diaphragms are deformable and without sliding portions.

14. A method for controlling a flow rate control device, the flow rate control device comprising:
a regulator configured to adjust a pressure of a fluid to be supplied, the regulator including:
a valve body movably seated in a valve seat arranged in a pathway that communicates between a flow intake port and a flow discharge port in the regulator;
an urging section configured to urge the valve body toward the valve seat; and
an operation section configured to resist an urging force of the urging section and to press the valve body to separate from the valve seat, the operation section controlling the pressure of the fluid by adjusting a pressing force thereof applied to the valve body;
an open/close valve provided downstream of the regulator, separated from but in fluid communication with the regulator, the open/close valve including:
an intake pathway provided within the open/close valve, the intake pathway being configured to receive the fluid from the regulator and flow the fluid therethrough;
a plurality of narrowed pathways provided within the open/close valve, the plurality of narrowed pathways being coupled to a downstream side of the intake pathway such that the plurality of narrowed pathways are in parallel with each other; and
an open/close section provided within the open/close valve and coupled to a downstream side of the plurality of the narrowed pathways, configured to switch one of the plurality of narrowed pathways between an open state and a closed state by moving between an open position and a closed position;
a discharge pathway configured to discharge the fluid supplied through each of the plurality of narrowed pathways;
a flow rate sensor configured to detect a flow rate of the fluid; and
a controller configured to control the regulator and the open/close section, the method comprising:

feed-back controlling the regulator via the controller based on the flow rate detected by the flow rate sensor, such that the flow rate of the fluid flowing through the discharge pathway coincides with a target flow rate, by placing the open/close section in the closed position if the target flow rate is smaller than a predetermined value, and in the open position if the target flow rate is greater than the predetermined value, wherein the valve body includes a first diaphragm partitioning the pathway from a housing area of the urging section and a second diaphragm partitioning the pathway from the operation section, the method further comprising:

moving the valve body by adjusting the pressing force applied to the second diaphragm from the operation section.

15. A method for controlling a flow rate control device, the flow rate control device comprising:

a regulator configured to adjust a pressure of a fluid to be supplied, the regulator including:

a valve body movably seated in a valve seat arranged in a pathway that communicates between a flow intake port and a flow discharge port in the regulator;

an urging section configured to urge the valve body toward the valve seat; and an operation section configured to resist an urging force of the urging section and press the valve body to separate from the valve seat, the operation section controlling the pressure of the fluid by adjusting a pressing force thereof applied to the valve body;

an open/close valve provided downstream of the regulator, separated from but in fluid communication with the regulator, the open/close valve including:

an intake pathway provided within the open/close valve, the intake pathway being configured to receive the fluid from the regulator and flow the fluid therethrough;

an open narrowed pathway provided within the open/close valve, the open narrow pathway being coupled to a downstream side of the intake pathway, the open narrowed pathway being always open;

an opened/closed narrowed pathway provided within the open/close valve, the opened/closed narrow pathway being coupled to a downstream side of the intake pathway so as to be in parallel with the open narrowed pathway, the opened/closed narrowed pathway configured to be switched between an open state and a closed state; and an open/close section configured to move between an open position and a closed position so as to switch the opened/closed narrowed pathway between the open state and the closed state;

a discharge pathway configured to discharge the fluid supplied through the open narrowed pathway and the opened/closed narrowed pathway;

a flow rate sensor configured to detect a flow rate of the fluid; and a controller configured to control the regulator and the open/close section, the method comprising:

feed-back controlling the regulator via the controller based on the flow rate detected by the flow rate sensor, such that the flow rate of the fluid flowing through the discharge pathway coincides with a target flow rate, by placing the open/close section in the closed position if the target flow rate is smaller than a predetermined value, and in the open position if the target flow rate is greater than the predetermined value, wherein the valve body includes a first diaphragm partitioning the pathway from a housing area of the urging section and a second diaphragm partitioning the pathway from the operation section, the method further comprising:

moving the valve body by adjusting the pressing force applied to the second diaphragm from the operation section.

\* \* \* \* \*